(12) United States Patent
Maggi

(10) Patent No.: US 8,948,959 B2
(45) Date of Patent: Feb. 3, 2015

(54) METHOD OF DETERMINING THE STRESS THAT SHOULD BE APPLIED TO A TYRE DURING AN INDOOR ENDURANCE BENCH TEST

(75) Inventor: Marco Andrea Maggi, Ariccia (IT)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 14/006,507

(22) PCT Filed: Mar. 26, 2012

(86) PCT No.: PCT/IB2012/051435
§ 371 (c)(1),
(2), (4) Date: Nov. 5, 2013

(87) PCT Pub. No.: WO2012/127458
PCT Pub. Date: Sep. 27, 2012

(65) Prior Publication Data
US 2014/0052324 A1     Feb. 20, 2014

(30) Foreign Application Priority Data
Mar. 24, 2011 (IT) .............. TO2011A0255

(51) Int. Cl.
*G01M 17/00* (2006.01)
*G06F 17/00* (2006.01)
*G01F 19/00* (2006.01)
*G01M 17/02* (2006.01)

(52) U.S. Cl.
CPC ............ *G01M 17/02* (2013.01); *G01M 17/022* (2013.01)
USPC .......................................... 701/29

(58) Field of Classification Search
CPC ........................... G01M 17/022; G01M 17/02
USPC ............................................. 4/29
See application file for complete search history.

(56) References Cited

U.S. PATENT DOCUMENTS

2005/0066719 A1   3/2005 Turner et al.
2009/0121891 A1   5/2009 Sigillito

FOREIGN PATENT DOCUMENTS

EP    1 258 839 A2   11/2002
EP    2 246 686 A1   11/2010

*Primary Examiner* — Maceeh Anwari
(74) *Attorney, Agent, or Firm* — Sughrue Mion, PLLC

(57) ABSTRACT

A method of determining the stress that should be applied to a tire during an indoor endurance bench test. The method includes the steps of driving a vehicle along a sample road route; measuring variations in the longitudinal speed and position of the vehicle during its journey along the sample road route; and calculating the inertial forces acting on the vehicle during its journey along the sample road route, on the basis of variations in the longitudinal speed and position of the vehicle.

19 Claims, 3 Drawing Sheets

METHOD OF DETERMINING THE STRESS THAT SHOULD BE APPLIED TO A TYRE DURING AN INDOOR ENDURANCE BENCH TEST

This application is a National Stage of International Application No. PCT/IB2012/051435 filed Mar. 26, 2012, claiming priority based on Italian Patent Application No. TO2011A000255 filed Mar. 24, 2011, the contents of all of which are incorporated herein by reference in their entirety.

TECHNICAL FIELD

The present invention relates to method of determining the stress that should be applied to a tyre during an indoor endurance bench test.

PRIOR ART

Various tests are carried out indoors using a test bench as bench testing has very low costs (use of a real vehicle and driver is not necessary) and offers extremely high repeatability (the stress applied to the tyre and the boundary conditions, such as temperature and characteristics of the road surface are known and easily adjusted). The test bench enables a wide variety of stresses to be applied to a tyre, but to render a bench test as realistic as possible (i.e. as similar as possible to what happens on the road) and to render an indoor bench test comparable to an outdoor test on public roads, it is necessary to know precisely the stresses to which a tyre is subjected during road use in order to reproduce them on the test bench. To this end, outdoor tests are carried out on public roads using a vehicle equipped with a measuring unit that measures and records the forces acting on the tyres; at the end of an outdoor test of this type, the measuring unit has recorded the course over time of the forces that acted on the tyres and this course over time is provided to the bench actuators so that it can be faithfully reproduced during indoor bench testing.

To reduce the overall duration of the outdoor test (which is planned to last a number of hours and cover several hundred kilometers) and to ensure that the outdoor test is conducted under repeatable conditions (obviously, as far as possible on roads open to the public), the vehicle should always be driven at the maximum speed permitted by the Highway Code during the outdoor test. However, it is evident that it is not always possible to drive the vehicle at the maximum speed permitted by the Highway Code, mainly due to traffic on roads open to the public. Consequently, also the course over time of the forces that acted on the tyres during an outdoor test on public roads is affected by the fact that the vehicle was not always driven at the maximum speed permitted by the Highway Code.

DESCRIPTION OF INVENTION

The object of the present invention is to provide a method to determine the stress that should be applied to a tyre during an indoor endurance bench test, this method being devoid of the above-described drawbacks and, in particular, of easy and inexpensive implementation.

According to the present invention, a method is provided to determine the stress that should be applied to a tyre during an indoor endurance bench test, as established in the appended claims.

BRIEF DESCRIPTION OF DRAWINGS

The present invention will now be described with reference to the attached drawings, which illustrate a non-limitative embodiment, where.

PREFERRED EMBODIMENTS OF THE INVENTION

Figure 1:
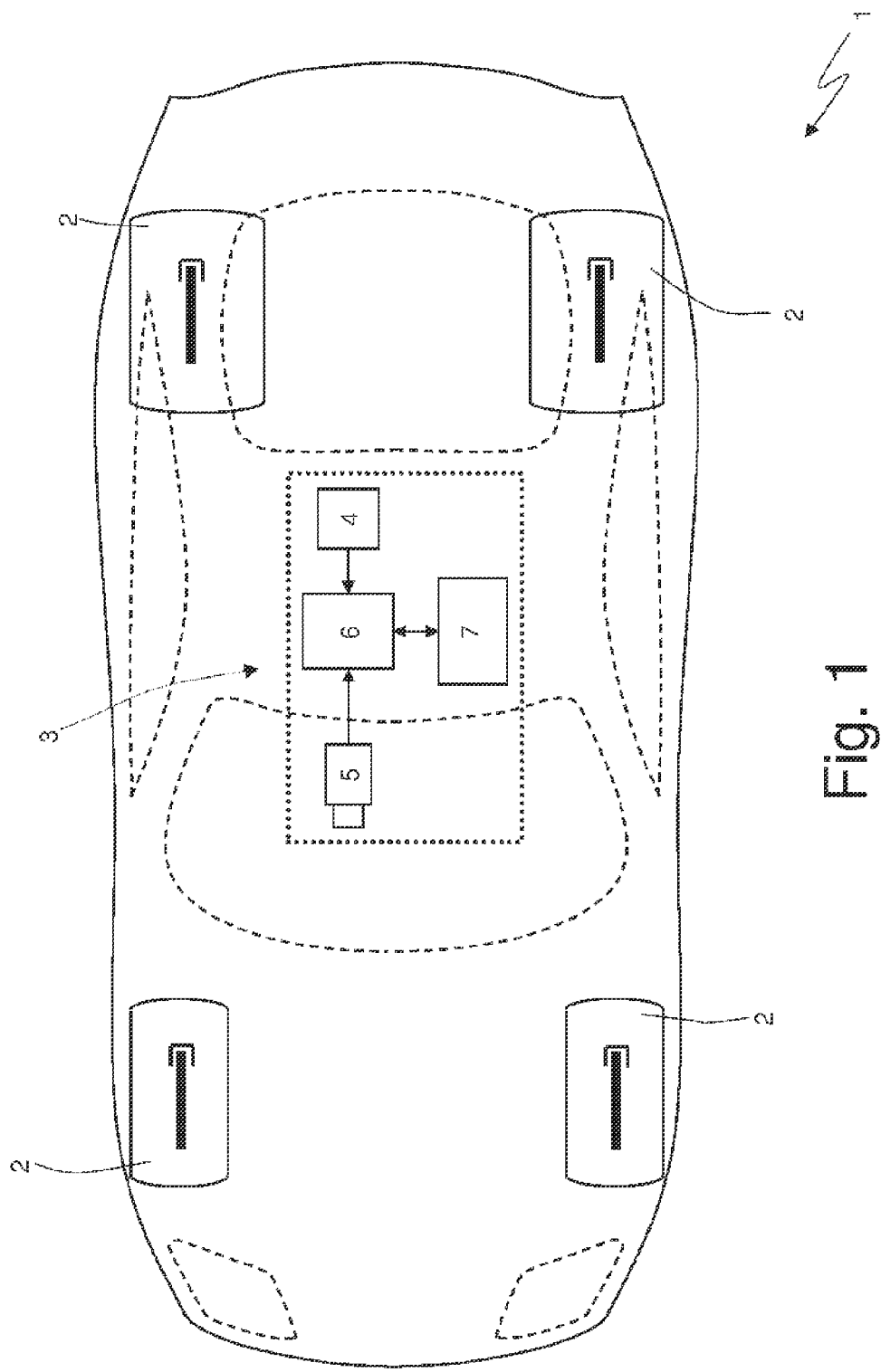
FIG. 1 schematically shows a vehicle equipped with a measuring unit for measuring the necessary physical quantities for subsequently estimating the forces that act on the tyres.
Figure 2:
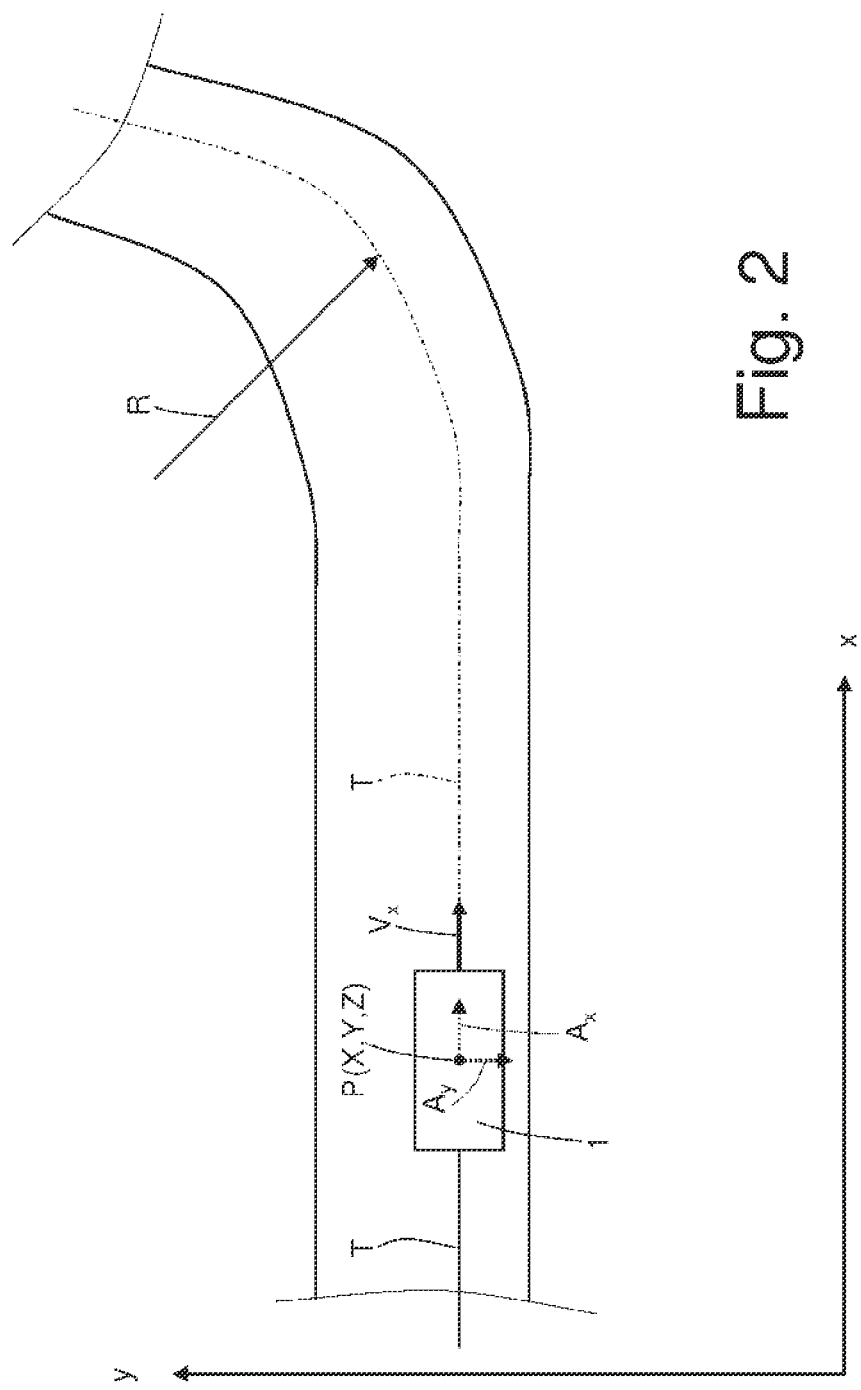
FIG. 2 schematically shows a section of a sample road route followed by the vehicle of FIG. 1.
Figure 3:
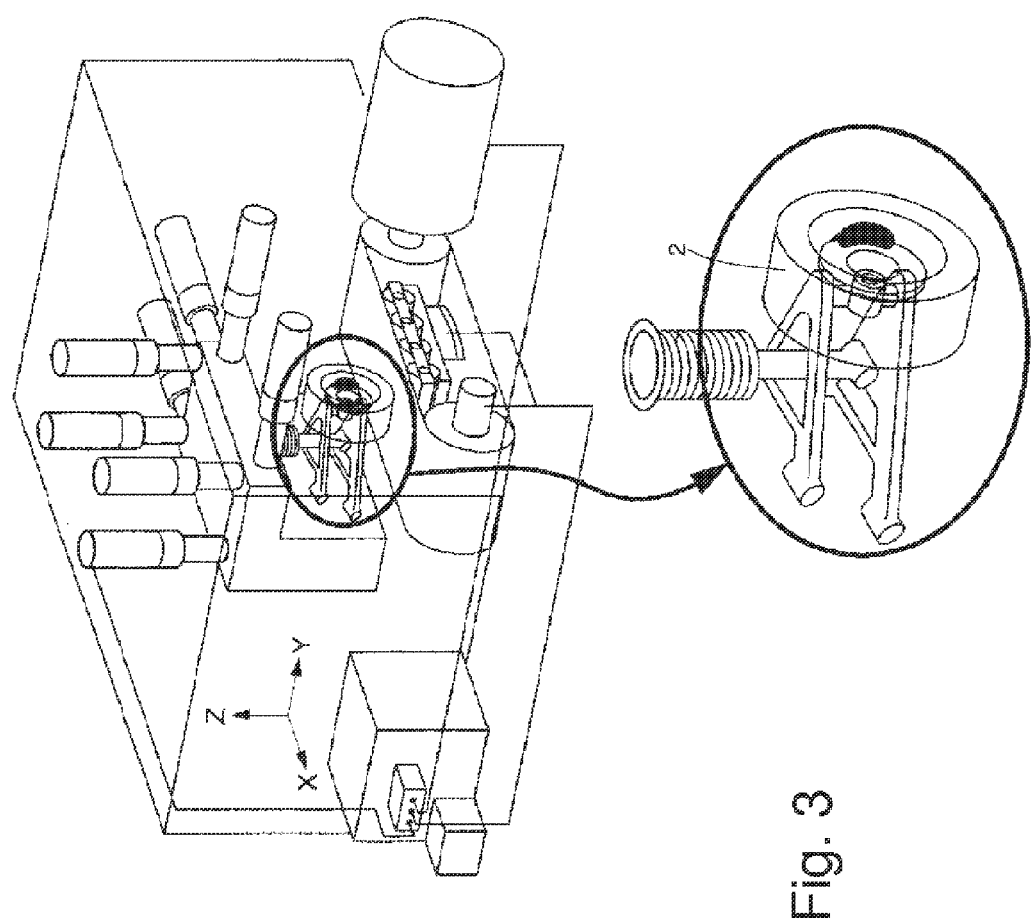
FIG. 3 schematically shows a test bench that subjects a tyre to an indoor endurance test.

In FIG. 1, reference numeral 1 indicates, in its entirety, a vehicle equipped with four tyres 2.

The vehicle 1 is equipment with a measuring unit 3 for measuring the necessary physical quantities for subsequently estimating the forces that act on the tyres 2. Thanks to the information recorded by the measuring unit 3, it is possible the determine the stress (forces) that should be applied to a tyre during an indoor endurance bench test to simulate with high accuracy a similar outdoor endurance test carried out on roads open to vehicular traffic. In other words, by processing the information recorded by the measuring unit 3, as described further on, it is possible to determine the course over time of the stress (forces) that should be applied to a tyre during an indoor endurance bench test to subject the tyre to the same wear that would take place in a similar outdoor endurance test carried out on roads open to vehicular traffic.

The measuring unit 3 comprises a satellite positioning device 4, which measures the longitudinal speed $V_x$ of forward movement of the vehicle 1 and the position P of the vehicle 1 in real time using the GPS standard. The position P of the vehicle 1 is defined by three coordinates X, Y, Z of a three-dimensional reference system having three mutually perpendicular axes; the X and Y coordinates correspond to latitude and longitude and define a plane, whilst the Z coordinate provides an altitude with respect to a reference plane (typically sea level).

In addition, the measuring unit 3 comprises a camera 5 that is arranged inside the vehicle to capture the road in front of the vehicle 1 (for example, the camera 5 could be placed facing the windscreen of the vehicle 1).

Lastly, the measuring unit 3 comprises a mass storage device 6 (consisting of a hard disk and/or RAM memory) capable of storing the data supplied by the satellite positioning device 4 and the camera 5, and a processing device 7 that is typically constituted by a personal computer, which could internally integrate the storage device 6.

The method used for determining the stress (forces) that should be applied to a tyre during an indoor endurance bench test to simulate with high accuracy a similar outdoor endurance test carried out on roads open to vehicular traffic, will now be described.

The vehicle 1 equipped with the measuring unit 3 is used to carry out the outdoor test that it is wished to simulate indoors and is consequently driven along a sample road route where testing is carried out outdoors on roads open to vehicular traffic.

The mass M of the vehicle 1 is determined beforehand, i.e. before starting the road test; according to one possible embodiment, the mass M of the vehicle 1 can be progressively updated (i.e. reduced) to take into account the reduction due to fuel consumption (which is easy to estimate from information provided by an electronic engine control unit).

While the vehicle 1 is being driven, the satellite positioning device 4 provides, in real time and with a relatively high sampling frequency (typically, at least several Hz), the position P of the vehicle 1 along the sample road route, constituted by the X, Y, Z set of coordinates, and the longitudinal speed $V_x$ of forward movement of the vehicle 1; this data is cyclically stored in the storage device 6 with a storage frequency of that is usually equal to the sampling frequency of the satellite positioning device 4 and is synchronized with the sampling frequency of the satellite positioning device 4.

In addition, while the vehicle 1 is being driven, the camera 5 provides images of the road in front of the vehicle 1 in real time; at least a part of these images is cyclically stored in the storage device 6 with a storage frequency that is usually equal to the sampling frequency of the satellite positioning device 4 and is synchronized with the sampling frequency of the satellite positioning device 4 (in this way, each stored image is associated with the corresponding position P of the vehicle 1 at the time when the image was taken).

Once the outdoor test terminates (or rather once the journey along the sample road route is completed), the information stored by the measuring unit 3 whilst travelling along the sample road route is processed to determine the stress (forces) that should be applied to a tyre during an indoor endurance bench test to simulate the outdoor endurance test with high accuracy.

According to a preferred embodiment, moving average filters are applied to the measurements supplied by the satellite positioning device 4 (in particular, to the longitudinal speed $V_x$ of forward movement of the vehicle 1) to eliminate any high frequency noise (very bothersome, especially in a time differentiation).

The first operation that is carried out is a correction of the longitudinal speeds $V_x$ of forward movement of the vehicle 1 to eliminate any substantial (significant) differences between the maximum permitted speeds $V_{x\text{-}max}$ (i.e. the maximum speeds permitted by the Highway Code) and the longitudinal speeds $V_x$ measured by the satellite positioning device 4.

For correcting the longitudinal speeds $V_x$, the entire sample road route is preferably divided into a series of sections, each of which is characterized by a single maximum permitted speed $V_{x\text{-}max}$ (i.e. maximum permitted speed $V_{x\text{-}max}$ is the same along the entire section). The size (or rather the length) of the sections into which the route is divided is generally determined in an experimental manner by carrying out various tests with different sizes and assessing the final result.

For each section of the sample road route, the maximum permitted speed $V_{x\text{-}max}$ (i.e. the maximum speed permitted by the Highway Code) is determined and then the maximum permitted speed $V_{x\text{-}max}$ is compared with the longitudinal speed $V_x$ measured by the satellite positioning device 4. Depending on the outcome of this comparison, a longitudinal speed $V_x$ equal to the longitudinal speed $V_x$ measured by the satellite positioning device 4, or a longitudinal speed $V_x$ different from the longitudinal speed $V_x$ measured by the satellite positioning device 4, can be used for subsequent processing (described in the following). In particular, a longitudinal speed $V_x$ equal to the longitudinal speed $V_x$ measured by the satellite positioning device 4 is used for subsequent processing (described in the following) when the measured longitudinal speed $V_x$ is not significantly different from the maximum permitted speed $V_{x\text{-}max}$; instead, a longitudinal speed $V_x$ (normally equal to the maximum permitted speed $V_{x\text{-}max}$) different from the longitudinal speed $V_x$ measured by the satellite positioning device 4 is used for subsequent processing (described in the following) when the measured longitudinal speed $V_x$ is significantly different from the maximum permitted speed $V_{x\text{-}max}$.

For each section of the sample road route, the comparison between longitudinal speed $V_x$ measured by the satellite positioning device 4 and maximum permitted speed $V_{x\text{-}max}$ can be made in a point-to-point manner, where a single value of the longitudinal speed $V_x$ measured by the satellite positioning device 4 is individually compared with the maximum permitted speed $V_{x\text{-}max}$ (and then individually corrected in the event of a significant difference). In other words, when the absolute value of the difference between a single value of the measured longitudinal speed $V_x$ and the maximum permitted speed $V_{x\text{-}max}$ is greater than a threshold value (generally determined experimentally and of the order of the few km/h), the single value of the measured longitudinal speed $V_x$ is "eliminated" and replaced by a "correct" value that is normally equal to the maximum permitted speed $V_{x\text{-}max}$.

In alternative, for each section of the sample road route, the comparison between longitudinal speed $V_x$ measured by the satellite positioning device 4 and maximum permitted speed $V_{x\text{-}max}$ can be made in an aggregate manner, where a series of values (for example, all the values of the section of the sample road route under consideration) are compared all together with the maximum permitted speed $V_{x\text{-}max}$ (and therefore all the values considered are corrected together in the event of significant difference). In this case, all of the values of the section under consideration are used together to calculate the value of a similarity index $I_{CR}$ that is then compared with a threshold value (generally determined experimentally). When the similarity index $I_{CR}$ is less than the threshold value, the longitudinal speeds $V_x$ measured by the satellite positioning device 4 along the route section under consideration are kept and used for subsequent processing (described in the following), whilst if the similarity index $I_{CR}$ is greater than the threshold value, then all the longitudinal speeds $V_x$ measured by the satellite positioning device 4 along the route section under consideration are "eliminated" and replaced by a "correct" value that is normally equal to the maximum permitted speed $V_{x\text{-}max}$. In other words, when the similarity index $I_{CR}$ is less than the threshold value, the longitudinal speeds $V_x$ along the route section under consideration are assumed to be equal to the longitudinal speeds $V_x$ measured by the satellite positioning device 4, while if the similarity index $I_{CR}$ is greater than the threshold value, then the longitudinal speeds $V_x$ along the route section under consideration are assumed to be equal to the maximum permitted speed $V_{x\text{-}max}$ (and therefore the longitudinal speeds $V_x$ measured by the satellite positioning device 4 are discarded).

According to a possible embodiment, the similarity index $I_{CR}$ is calculated using mean square deviations as described in the following equations (the first equation is applicable in the case of an analogue signal, while the second equation is applicable in the case of a digital signal):

$$I_{CR}^2 = \frac{1}{t_1 - t_0} \cdot \int_{t_0}^{t_1} \left[ V_x(t) - V_{x\text{-}max}(t) \right]^2 \cdot dt$$

$$I_{CR}^2 = \frac{1}{N} \cdot \sum_{i=1}^{N} \left[ V_x^i - V_{x\text{-}max}^i \right]^2$$

From that described above, it is evident that the purpose of correcting the longitudinal speeds $V_x$ of forward travel is to correct the longitudinal speeds $V_x$ measured by the satellite positioning device 4 to ensure that the longitudinal speeds $V_x$ are always in the neighbourhood of the corresponding maximum permitted speeds $V_{x\text{-}max}$. Consequently, a longitudinal speed $V_x$ equal to the maximum permitted speed $V_{x\text{-}max}$ is always used for subsequent processing (described in the following) when the longitudinal speed $V_x$ measured by the satellite positioning device 4 is significantly different from the maximum permitted speed $V_{x\text{-}max}$.

For each section of the sample road route, the corresponding maximum permitted speed $V_{x\text{-}max}$ can be determined on the basis of the position P of the vehicle 1 and by using a roadmap that provides Highway Code speed limit information. In other words, for each section of the sample road route, the corresponding maximum permitted speed $V_{x\text{-}max}$ is provided by a roadmap that provides Highway Code speed limit information. Alternatively, or in combination with use of a roadmap, it is possible to determine the corresponding maximum permitted speed $V_{x\text{-}max}$ for each section of the sample road route by exploiting information contained in the images of the road in front of the vehicle 1 taken by the camera 5. In this case, each image of the road in front of the vehicle 1 is processed by analysis software to recognize Highway Code speed limit signs; therefore, the corresponding maximum permitted speed $V_{x\text{-}max}$ for each section of the sample road route is determined on the basis of information provided by the Highway Code speed limit signs that are in the images of the road in front of the vehicle 1 taken by the camera 5. According to a preferred embodiment, information provided by the road signs has priority over information contained in the roadmap, as roadmaps are unlikely to be updated in real time and, in any case, can contain inaccuracies. Typically, it is always attempted to determine the maximum permitted speeds $V_{x\text{-}max}$ using just the information contained in the images of the road in front of the vehicle 1 taken by the camera 5 and roadmaps are only used when the information contained in the images of the road in front of the vehicle 1 is insufficient or undecipherable (for example, when the road signs are absent or illegible).

Once the above-described correction of the longitudinal speeds $V_x$ of forward travel has been performed, the stresses (or forces) that should be applied to a tyre during an indoor endurance bench test to simulate with high accuracy the outdoor endurance test are calculated.

Using the longitudinal speed $V_x$ data of forward movement of the vehicle 1, corrected as previously described, the processing device 7 calculates a longitudinal acceleration $A_x$ of the vehicle 1 by determining the rate of change (first time derivative) of the longitudinal speed $V_x$ of forward movement of the vehicle 1.

In addition, using the position P data of the vehicle 1 stored in the storage device 6, the processing device 7 determines a trajectory T of the vehicle 1 in the plane defined by the two coordinates X and Y (corresponding to latitude and longitude); in other words, the trajectory T of the vehicle 1 is given by the evolution of the position P of the vehicle 1 in the plane defined by the X and Y coordinates. Successively, the processing device 7 calculates a radius (R) of curvature of the trajectory T of the vehicle 1 through simple geometrical calculations and then calculates a lateral acceleration $A_y$ of the vehicle 1 based on the longitudinal speed $V_x$ of forward movement (corrected as previously described) and the radius (R) of curvature of the trajectory T through a simple mathematical operation described by the following equation:

$$A_y = V_x^2/R$$

The processing device 7 calculates a longitudinal inertial force $FI_x$ acting on the vehicle 1 by multiplying the mass M of the vehicle 1 by the longitudinal acceleration $A_x$ of the vehicle 1 and calculates a lateral inertial force $FI_y$ acting on the vehicle 1 by multiplying the mass M of the vehicle 1 by the longitudinal acceleration $A_x$ of the vehicle 1 as described by the following equations:

$$FI_x = M*A_x$$

$$FI_y = M*A_y$$

According to a preferred embodiment, the processing device 7 determines an altitude of the vehicle 1 based on the third coordinate Z, determines the gradient of the road on which the vehicle 1 travels based on the evolution of the altitude of the vehicle 1 through simple geometrical calculations and, lastly, determines a gravitational force FG acting on the vehicle 1 based on the gradient of the road on which the vehicle 1 travels through simple geometrical calculations. In other words, the gravitational force FG acting on the vehicle 1 is calculated by multiplying the overall weight force acting on the vehicle 1 (equal to mass M multiplied by gravitational acceleration G) by the sine of the gradient angle of the road on which the vehicle 1 travels.

According to a preferred embodiment, the processing device 7 also determines an aerodynamic force FA acting on the vehicle 1 as a function of the longitudinal speed $V_x$ of forward movement of the vehicle 1; the aerodynamic force FA can be calculated by using a theoretically-determined equation having experimentally-determined parameters, or can be calculated using an experimentally-determined table (typically using interpolation between the points of the table).

Finally, the processing device 7 determines the overall longitudinal force $F_x$ acting on the vehicle 1 by algebraically adding (i.e. taking positive and negative signs into account) the longitudinal inertial force $FI_x$ (having a positive or negative sign corresponding to a deceleration or an acceleration), the gravitational force FG (having a positive or negative sign corresponding to a descent or a rise) and the aerodynamic force FA (always having a negative sign), as described by the following equation:

$$F_x = FI_x + FG + FA$$

Instead, the overall lateral force $F_y$ acting on the vehicle 1 is assumed to be equal to the lateral inertial force $FI_y$, i.e. contributions other than the lateral inertial force $FI_y$ are not contemplated.

The overall forces $F_x$ and $F_y$ acting on the vehicle 1 are divided between the tyres 2, i.e. a partial quota of the overall forces $F_x$ and $F_y$ acting on the vehicle 1 is determined for each tyre 2, based on the geometrical characteristics of the vehicle 1 (i.e. the distribution of masses in the vehicle 1) and the types of suspension on the vehicle 1.

The above-described method for determining the stress that should be applied to a tyre during an indoor endurance bench test has numerous advantages.

First of all, the above-described method is of simple and inexpensive implementation, as the use of two measuring instruments (satellite positioning device 4 and camera 5) that are relatively inexpensive, easy to install and do not require any presetting, is contemplated.

The above-described method is extremely precise and, above all, is in no way affected by time drifts, as the satellite positioning device 4 has low noise levels, provides high precision and is not affected by time drifts (either due to component aging or thermal effects) as, unlike an accelerometer, it has no sensitive elements physically involved in taking measurements.

The satellite positioning device 4 is in no way affected by movements of the body of the vehicle 1 and therefore the measurements provided by the satellite positioning device 4 are not in any way influenced by movements of the body of the vehicle 1 on the suspension.

Thanks to the information provided by the satellite positioning device 4 on the altitude of the vehicle 1, it is also possible to determine the gravitational force FG acting on the vehicle (1) with precision, based on the gradient of the road on which the vehicle (1) is travelling.

Finally, thanks to the above-described operation of correcting the longitudinal speeds $V_x$, the inevitable differences between the effective longitudinal speeds $V_x$ (i.e. measured by the satellite positioning device 4) and the desired speeds (i.e. the maximum permitted speeds $V_{x\text{-}max}$ according to the Highway Code) are completely eliminated and therefore the stresses (or forces) to apply to a tyre during an indoor endurance test are not only very close to reality (i.e. almost perfectly simulating a real outdoor test on public roads), but are also applied under nominal conditions, i.e. with the longitudinal speeds $V_x$ (substantially) equal to the desired speeds.

The invention claimed is:

1. A method of determining the stress that should be applied to a tire during an indoor endurance bench test, the method comprising the steps of:
   driving a vehicle (1) along a sample road route;
   measuring variations in the longitudinal speed ($V_x$) and position (P) of the vehicle (1) as it travels along the sample road route; and
   calculating via an electronic control unit the inertial forces ($FI_x$, $FI_y$) acting on the vehicle (1) as it travels along the sample road route, on the basis of variations in the longitudinal speed ($V_x$) and position (P) of the vehicle (1);
   determining the maximum permitted speed ($V_{x\text{-}max}$) along at least one section of the sample road route;
   comparing the measured longitudinal speed ($V_x$) with the maximum permitted speed ($V_{x\text{-}max}$); and
   calculating the inertial forces ($FI_x$, $FI_y$) acting on the vehicle (1) using a longitudinal speed ($V_x$) other than the measured longitudinal speed ($V_x$) when the measured longitudinal speed ($V_x$) differs significantly from the maximum permitted speed ($V_{x\text{-}max}$);
   considering the measured longitudinal speed ($V_x$) as point-to-point when differing significantly from the maximum permitted speed ($V_{x\text{-}max}$) when the absolute difference between the measured longitudinal speed ($V_x$) and the maximum permitted speed ($V_{x\text{-}max}$) is above a predetermined first threshold value; and
   comprising the further step of point-to-point correction of the measured longitudinal speed ($V_x$) when necessary.

2. A method according to claim 1 and comprising the further step of dividing the overall sample road route into a series of sections, each having one maximum permitted speed ($V_{x\text{-}max}$).

3. A method according to claim 1 and comprising the further step of calculating the inertial forces ($FI_x$, $FI_y$) acting on the vehicle (1) using a longitudinal speed ($V_x$) equal to the maximum permitted speed ($V_{x\text{-}max}$), when the measured longitudinal speed ($V_x$) differs significantly from the maximum permitted speed ($V_{x\text{-}max}$).

4. A method according to claim 1 and comprising the further step of considering, along a whole section of the sample road route, the measured longitudinal speed ($V_x$) differing significantly from the maximum permitted speed ($V_{x\text{-}max}$), when the mean square deviation, calculated along the whole section, between the measured longitudinal speed ($V_x$) and the maximum permitted speed ($V_{x\text{-}max}$) is above a predetermined second threshold value.

5. A method according to claim 4 and comprising the further step of correcting the measured longitudinal speed ($V_x$) along the whole section of the sample road route when necessary.

6. A method according to claim 1 and comprising the further step of determining the maximum permitted speed ($V_{x\text{-}max}$) of each section of the sample road route on the basis of the position (P) of the vehicle (1), and using a road map indicating Highway Code speed limits.

7. A method according to claim 1 and comprising the further steps of:
   acquiring images of the road ahead of the vehicle (1) as it travels along the sample road route;
   recognizing Highway Code speed limit signs in the images of the road ahead of the vehicle (1); and
   determining the maximum permitted speed ($V_{x\text{-}max}$) of each section of the sample road route on the basis of the Highway Code speed limit signs.

8. A method according to claim 7, wherein, in the event of conflict, speed limit signs have priority over the speed limit information in the road map.

9. A method according to claim 1 and comprising the further steps of:
   determining the longitudinal acceleration ($A_x$) of the vehicle (1) by calculating the rate of change in the longitudinal speed ($V_x$) of the vehicle (1);
   determining a trajectory (T) of the vehicle (1) on the basis of variations in the position (P) of the vehicle (1);
   determining a radius (R) of curvature of the trajectory (T) of the vehicle (1);
   calculating the lateral acceleration ($A_y$) of the vehicle (1) on the basis of longitudinal speed ($V_x$) and the radius (R) of curvature of the trajectory (T);
   calculating a longitudinal inertial force ($FI_x$) acting on the vehicle (1) by multiplying the mass (M) of the vehicle (1) by the longitudinal acceleration ($A_x$) of the vehicle (1); and
   calculating a lateral inertial force ($FI_y$) acting on the vehicle (1) by multiplying the mass (M) of the vehicle (1) by the longitudinal acceleration ($A_x$) of the vehicle (1).

10. A method according to claim 9, wherein the position (P) of the vehicle (1) is defined by three coordinates (X, Y, Z), and the trajectory (T) of the vehicle (1) is determined in the plane defined by two coordinates (X, Y) corresponding to latitude and longitude.

11. A method according to claim 10 and comprising the further steps of:
   determining the altitude of the vehicle (1) on the basis of a third coordinate (Z);
   determining the gradient of the road on which the vehicle (1) is travelling, on the basis of variations in the altitude of the vehicle (1);
   determining a gravitational force (FG) acting on the vehicle (1) on the basis of the gradient of the road on which the vehicle (1) is travelling; and
   algebraically adding the gravitational force (FG) and the longitudinal inertial force ($FI_x$).

12. A method according to claim 9 and comprising the further steps of:
   determining an aerodynamic force (FA) acting on the vehicle (1) on the basis of the longitudinal speed ($V_x$) of the vehicle (1); and
   algebraically adding the aerodynamic force (FA) and the longitudinal inertial force ($FI_x$).

13. A method according to claim 9, wherein the longitudinal speed ($V_x$) and position (P) of the vehicle (1) are measured by a satellite positioning device (4).

14. A method of determining the stress that should be applied to a tire during an indoor endurance bench test, the method comprising the steps of:

driving a vehicle along a sample road route;
measuring variations in the longitudinal speed and position of the vehicle as it travels along the sample road route; and
calculating via an electronic control unit the inertial forces acting on the vehicle as it travels along the sample road route, on the basis of variations in the longitudinal speed and position of the vehicle;
determining the maximum permitted speed along at least one section of the sample road route;
comparing the measured longitudinal speed with the maximum permitted speed; and
calculating the inertial forces acting on the vehicle using a longitudinal speed other than the measured longitudinal speed when the measured longitudinal speed differs significantly from the maximum permitted speed;
acquiring images of the road ahead of the vehicle as it travels along the sample road route;
recognizing Highway Code speed limit signs in the images of the road ahead of the vehicle; and
determining the maximum permitted speed of each section of the sample road route on the basis of the Highway Code speed limit signs;
wherein, in the event of conflict, speed limit signs have priority over the speed limit information in the road map.

15. A method of determining the stress that should be applied to a tire during an indoor endurance bench test, the method comprising the steps of:
driving a vehicle along a sample road route;
measuring variations in the longitudinal speed and position of the vehicle as it travels along the sample road route; and
calculating via an electronic control unit the inertial forces acting on the vehicle as it travels along the sample road route, on the basis of variations in the longitudinal speed and position of the vehicle;
determining the maximum permitted speed along at least one section of the sample road route;
comparing the measured longitudinal speed with the maximum permitted speed; and
calculating the inertial forces acting on the vehicle using a longitudinal speed other than the measured longitudinal speed when the measured longitudinal speed differs significantly from the maximum permitted speed;
determining the longitudinal acceleration of the vehicle by calculating the rate of change in the longitudinal speed of the vehicle;
determining a trajectory of the vehicle on the basis of variations in the position of the vehicle;
determining a radius of curvature of the trajectory of the vehicle;
calculating the lateral acceleration of the vehicle on the basis of longitudinal speed and the radius of curvature of the trajectory;
calculating a longitudinal inertial force acting on the vehicle by multiplying the mass of the vehicle by the longitudinal acceleration of the vehicle; and
calculating a lateral inertial force acting on the vehicle by multiplying the mass of the vehicle by the longitudinal acceleration of the vehicle.

16. A method according to claim 15, wherein the position of the vehicle is defined by three coordinates, and the trajectory of the vehicle is determined in the plane defined by two coordinates corresponding to latitude and longitude.

17. A method according to claim 16 and comprising the further steps of:
determining the altitude of the vehicle on the basis of a third coordinate;
determining the gradient of the road on which the vehicle is travelling, on the basis of variations in the altitude of the vehicle;
determining a gravitational force acting on the vehicle on the basis of the gradient of the road on which the vehicle is travelling; and
algebraically adding the gravitational force and the longitudinal inertial force.

18. A method according to claim 15 and comprising the further steps of:
determining an aerodynamic force acting on the vehicle on the basis of the longitudinal speed of the vehicle; and
algebraically adding the aerodynamic force and the longitudinal inertial force.

19. A method according to claim 15, wherein the longitudinal speed and position of the vehicle are measured by a satellite positioning device.

* * * * *